United States Patent Office 3,114,529
Patented Dec. 17, 1963

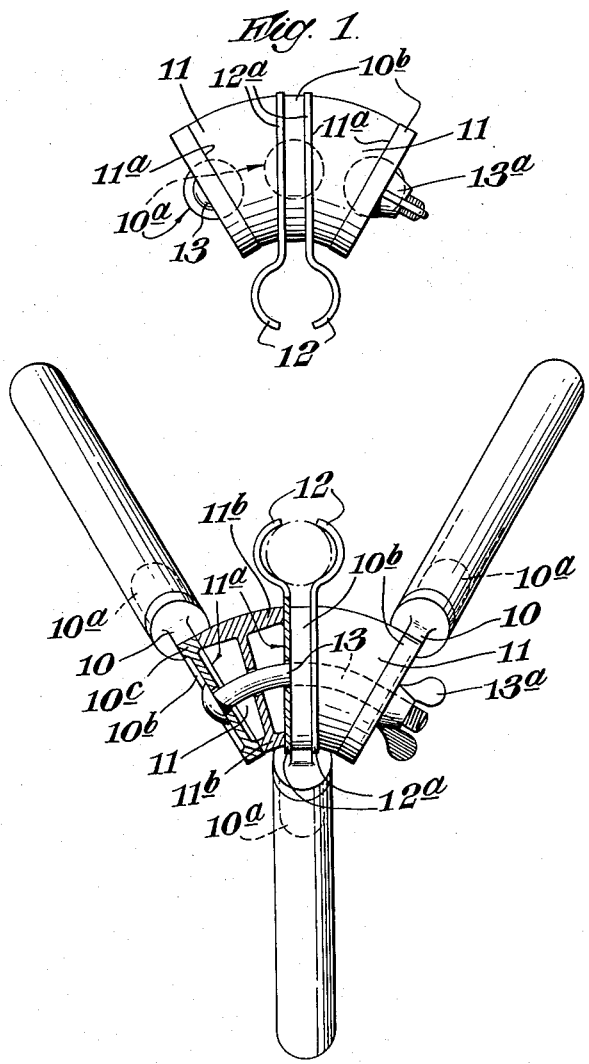

3,114,529
SUPPORTING DEVICES
Christopher Stanley Mills, 22 Pine Crescent, Highcliffe,
Christchurch, England
Filed Apr. 10, 1961, Ser. No. 101,700
Claims priority, application Great Britain Apr. 11, 1960
2 Claims. (Cl. 248—168)

The present invention concerns adjustable legged supporting devices, that is to say, supports of the kind consisting of tri- or quadripods used for supporting cameras, survey instruments and the like, in which the tops of the legs are carried by a head and can pivot in relation thereto, the head also having support means for mounting a camera or the like, the pivoting enabling the legs to be folded together when not in use, or opened out to desired relative angularity and locked in position to serve as a rigid support.

An object of the present invention is to provide a supporting device of simple construction which can be set up and folded easily and quickly, and which is completely rigid when set up. A further object is to provide a construction which is capable of adjustment over a wide range, and in which the effectiveness of adjustment and rigidity is not dependent upon close manufacturing tolerances.

According to the present invention a supporting device of the kind above set forth comprises a head consisting of an arcuately curved uniting bolt which carries flattened upper ends of the legs or flattened tops for attachment of said legs, which ends or tops are spaced apart by wedge elements carried by the bolt, said bolt also carrying means for holding an article (such as a camera or other instrument), the ends or tops and wedges being rotatable on the bolt, the arrangement being such that the wedges and ends or tops can be adjusted around the bolt and locked by a nut or other tightening means.

The invention also consists of a supporting device of the kind above set forth comprising a head consisting of an arcuately curved uniting bolt which carries elements consisting of three flattened leg ends or tops for attachment to legs, and a pair of wedges arranged with the ends or tops one on the outside of each wedge, and the third between the wedges, and clamp plates carried by the bolt between the wedges, the arrangement being such that the wedges and ends or tops can be adjusted around the bolt, the wedges resulting in the provision of varying angular adjustment between the legs from a substantially parallel planar position to desired relative angularity, means being provided for locking the elements in desired adjusted position.

Conveniently, a pair of clamp plates is provided, one leg end or top being positioned between the said plates with a wedge on the outside of each plate, and a leg end or top on the outside of each wedge.

It will be understood that adjacent surfaces of the elements, viz., wedges, ends or tops, and clamp plates, are flat to provide surfaces which bear on one another and are held by friction when the assembly is tightened. Further, the elements have holes therethrough for the passage of the bolt.

The wedges, on combination with the curved rod, enable a wide degree of adjustment of the legs and clamp to be obtained.

In order that a clear understanding of the invention may be obtained, reference will now be made to the accompanying drawings which show, by way of example, a preferred embodiment. In the drawings:

FIGURE 1 is a plan view of the assembly in the closed position, i.e., with the legs folded in substantially parallel planes.

FIGURE 2 is a similar view with the legs open or angled apart.

As shown in the drawings, the support comprises three legs 10, these being mounted at their upper ends each on a top spigot part 10a in the form of a tube over which a hollow leg slides. Each leg may be fixed to its top, or it can be detachably secured. Each top spigot part 10a extends radially from a disc 10b, these discs having thickened rim parts 10c as exemplified in the broken-away part.

Wedges or pivot blocks 11 are provided, these being in the form of discs, the side surfaces 11a, 11a, of which slope relatively to provide a wedge. The wedges also have thickened rims 11b, and are of a substantially T cross-section. The rims on the parts provide circumferential bearing surfaces on adjacent parts.

Clamp plates 12, 12, also are provided; these plates are of a convenient length and shaped to provide between them jaws to grip a rod. The jaws have D-shaped centre parts 12a, 12a, projecting from one long edge.

The discs 10b, wedges 11 and centre parts 12a have centre apertures or axial bores whereby they can be threaded on to suitable fastening means, for example, an arcuate bolt 13 with an engaging locking nut 13a. It will be noted that the centre leg top is positioned between the clamp plate centre parts, which have a wedge on each side, and each wedge a leg on the outside.

As seen in FIGURE 1, the parts have been moved to a position wherein the three legs extend down and are in parallel planes. In FIGURE 2, the parts have been swung round so that the three legs diverge from the head to form a tripod. The most satisfactory way to open out the support is to splay the legs into position by holding the two outer legs and positioning the wedges by the thumbs. The bolt takes up its position. The bracket or clamp is now held in position and the assembly secured by tightening the nut, the whole assembly being rigidly held together.

It will thus be seen that as the wedges 11 are rotated, the discs 10b and the longitudinal axis of their apertures will be angularly displaced. This causes the arcuate bolt 13 to be similarly rotated as the wedges are turned. The turning of one wedge 11 influences the position of the other wedge by means of the arcuate bolt 13 which cannot be rotated without rotating both wedges due to the non-parallel axes of the disc apertures.

The bracket or clamp can be set in any desired position in the vertical plane through 180°.

It will be noted that the legs are taken right up to the head joint, and the angle between the longitudinal axes of the outer legs can be varied between 0° and twice the angle of a wedge by rotating the wedges in relation to the legs.

The form of bracket or clamp is, of course, such that it is suitable for the apparatus to be supported. It need not necessarily be in the form of two plates, as shown, but could comprise a single centre part having any suitable clamping device extending.

Any suitable form of leg can be provided so long as its top can be carried by the bolt and is operated with the wedges.

I claim:

1. A supporting device for cameras and the like, comprising, a plurality of legs each provided with a disc at one end, said discs having an axial bore, a rim on each of said discs having flat opposite surfaces disposed in parallel planes, rotatable means disposed between each pair of said discs and retaining said legs in a selective angular relationship, said rotatable means comprising a plurality of circular pivot blocks each having an axial bore, the opposite ends of each of said blocks including flat converging surfaces providing wedge-shaped blocks, whereby the longitudinal axes of said bores in said blocks and said discs are angularly displaced with respect to one another, an arcuately curved bolt passing through said bores in said discs and said blocks and including means for releasably locking said disc and blocks in abutting selective angular relationship, whereby upon loosening of said locking means, subsequent rotation of any of said blocks will cause angular displacement of the adjacent discs as well as rotation of said bolt to also cause rotation of the other of said blocks and insure substantial equal displacement of all of said discs.

2. A supporting device for cameras, and the like according to claim 1, including, an article supporting bracket comprising a pair of clamp plates, said clamp plates having center portions disposed between two of said blocks, whereby release of said locking means permits rotatable adjustment of said bracket independent of the relative position of said blocks and discs.

References Cited in the file of this patent

UNITED STATES PATENTS

| | | |
|---|---|---|
| 115,128 | Southwick | May 23, 1871 |
| 624,572 | Sturgess | May 9, 1899 |
| 2,706,610 | Roberts | Apr. 19, 1955 |
| 2,769,895 | Boord | Nov. 6, 1956 |
| 2,994,138 | Fourlan | Aug. 1, 1961 |